United States Patent
Usa (10) Patent No.: US 12,187,379 B2
(45) Date of Patent: Jan. 7, 2025

(54) POWER UNIT

(71) Applicant: SUZUKI MOTOR CORPORATION, Hamamatsu (JP)

(72) Inventor: Kazutoshi Usa, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/465,714

(22) Filed: Sep. 12, 2023

(65) Prior Publication Data

US 2024/0166303 A1 May 23, 2024

(30) Foreign Application Priority Data

Nov. 17, 2022 (JP) ................................. 2022-184019

(51) Int. Cl.
*B62M 11/02* (2006.01)
(52) U.S. Cl.
CPC .................................. *B62M 11/02* (2013.01)
(58) Field of Classification Search
CPC .... B62M 7/02–06; B62M 7/12; B62M 11/12; B62K 2204/00
See application file for complete search history.

(56) References Cited

U.S. PATENT DOCUMENTS

| | | | | |
|---|---|---|---|---|
| 635,664 A | * | 10/1899 | Coursey | B62M 1/10 185/43 |
| 965,950 A | * | 8/1910 | Schaeffer | B62M 7/12 180/205.5 |
| 4,066,142 A | * | 1/1978 | Hooper | B62K 11/04 280/288.3 |
| 10,961,905 B2 | * | 3/2021 | Nukada | B62K 11/06 |

FOREIGN PATENT DOCUMENTS

JP 6934905 B2 8/2021

* cited by examiner

*Primary Examiner* — Thomas C Diaz
(74) *Attorney, Agent, or Firm* — Stein IP, LLC (57) ABSTRACT

A power unit in which a gear case is provided on one side, in a vehicle width direction, of a motor case. An opening of the gear case is covered with a gear case cover from an outside in the vehicle width direction. The power unit includes a motor shaft protruding toward the gear case from a motor case side, a drive shaft protruding outward in the vehicle width direction from the gear case cover, and a power transmission mechanism configured to transmit, to the drive shaft, power from the motor shaft. An output gear is fixed to the motor shaft, inside the gear case cover. A drive sprocket is fixed to the drive shaft, outside the gear case cover. The drive sprocket is positioned inward, in the vehicle width direction, of the output gear.

8 Claims, 8 Drawing Sheets

POWER UNIT

CROSS-REFERENCE TO RELATED APPLICATIONS

This application is based on and claims priority under 35 USC 119 from Japanese Patent Application No. 2022-184019 filed on Nov. 17, 2022, the entire content of which is incorporated herein by reference.

TECHNICAL FIELD

The present invention relates to a power unit of an electric vehicle.

BACKGROUND ART

In the related art, as a power unit of an electric vehicle, a power unit configured to reduce and transmit power from an electric motor to a rear wheel is known (for example, see JP6934905B). A reduction gear train is accommodated in a gear case of the power unit described in JP6934905B, and power is transmitted from a motor shaft of the electric motor to a drive shaft via the reduction gear train. The drive shaft of the power unit protrudes laterally from a gear case cover, and a drive sprocket is attached to a distal end of the drive shaft. A driven sprocket is attached to an axle of a rear wheel, and power is transmitted from the drive sprocket to the driven sprocket via a drive chain.

In the electric vehicle described in JP6934905B, since a chain line of the drive chain protrudes outward in a vehicle width direction, the electric vehicle and the power unit may become large.

SUMMARY OF INVENTION

Aspect of non-limiting embodiments of the present disclosure relates to provide a power unit capable of reducing the vehicle size and the unit size.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a power unit in which a gear case is provided on one side, in a vehicle width direction, of a motor case, an opening of the gear case being covered with a gear case cover from an outside in the vehicle width direction, the power unit including:
- a motor shaft protruding toward the gear case from a motor case side;
- a drive shaft protruding outward in the vehicle width direction from the gear case cover; and
- a power transmission mechanism configured to transmit, to the drive shaft, power from the motor shaft, in which an output gear is fixed to the motor shaft, inside the gear case cover, a drive sprocket is fixed to the drive shaft, outside the gear case cover, and the drive sprocket is positioned inward, in the vehicle width direction, of the output gear.

BRIEF DESCRIPTION OF DRAWINGS

Exemplary embodiment(s) of the present invention will be described in detail based on the following figures, wherein.

DESCRIPTION OF EMBODIMENTS

In a power unit according to an exemplary embodiment of the present invention, a gear case is provided on one side of the motor case in a vehicle width direction, and an opening of the gear case is covered with a gear case cover from the outside in the vehicle width direction. A motor shaft protrudes toward the gear case from the motor case, a drive shaft protrudes outward from the gear case cover in the vehicle width direction, and a power transmission mechanism is configured to transmit power from the motor shaft to the drive shaft. An output gear is fixed to the motor shaft inside the gear case cover, a drive sprocket is fixed to the drive shaft outside the gear case cover, and the output gear and the drive sprocket are provided on one side in the vehicle width direction. Accordingly, the power transmission mechanism is formed compactly. The drive sprocket outside the gear case cover is positioned inward, in the vehicle width direction, of the output gear inside the gear case cover, and the drive sprocket is prevented from protruding outward in the vehicle width direction. The chain line of the drive chain wound around the drive sprocket of the power unit and the driven sprocket of the drive wheel is moved inward in the vehicle width direction, and the sizes of the electric vehicle and the power unit are reduced.

Embodiment

Figure 1:
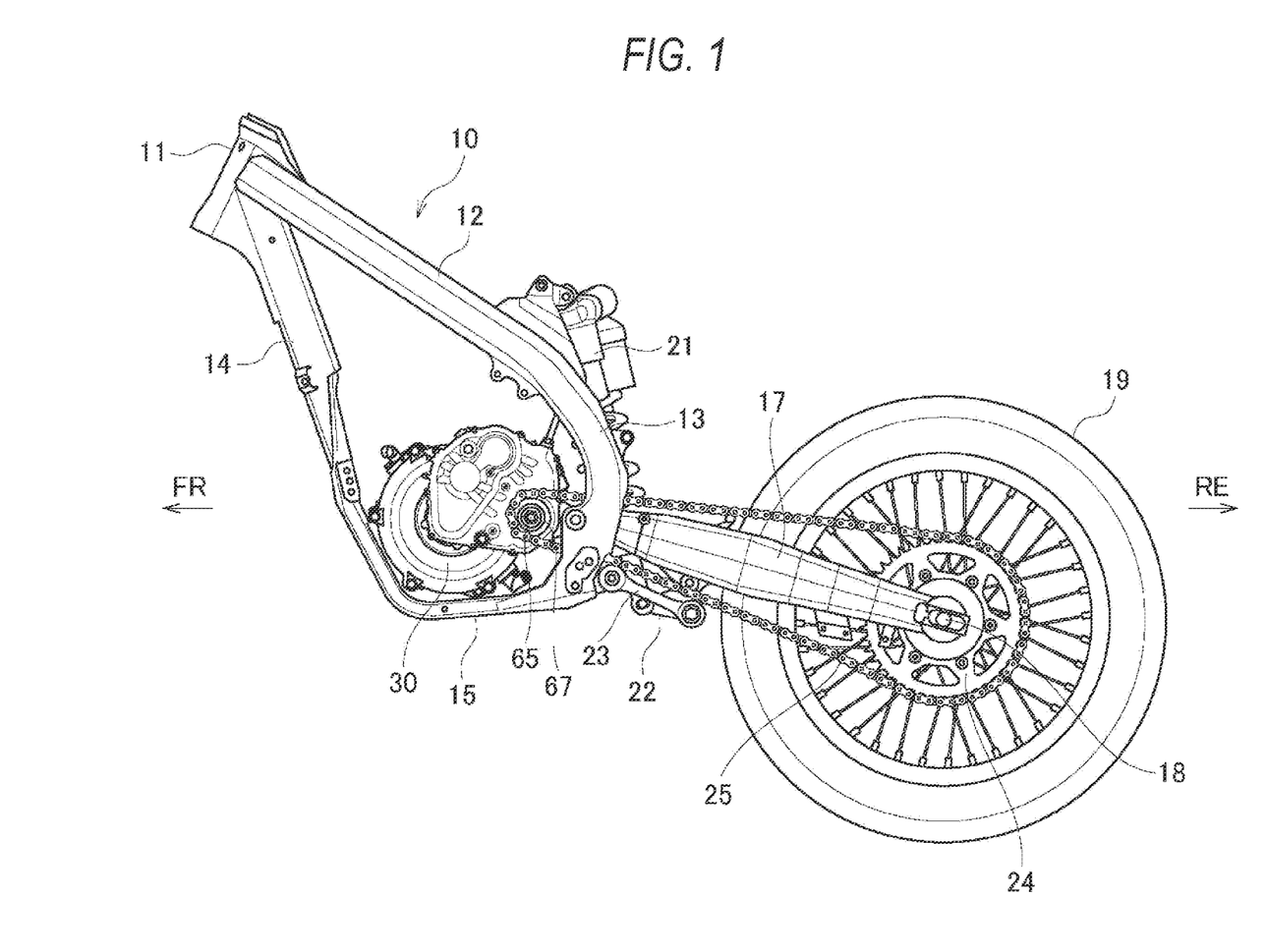
FIG. 1 is a side view of a vehicle body frame and a vehicle rear portion according to an exemplary embodiment of the present invention.

Hereinafter, an electric vehicle according to the present embodiment will be described with reference to the accompanying drawings. FIG. 1 is a side view of a vehicle body frame and a vehicle rear portion according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, various components such as a power unit 30 and an electrical system are mounted on a vehicle body frame 10 of the electric vehicle. A main frame 12 extends rearward and obliquely downward from a head pipe 11 of the vehicle body frame 10. A rear portion of the main frame 12 is a body frame 13 bent downward. A down frame 14 extends downward from the head pipe 11. A lower frame 15 bent rearward is connected to a lower portion of the down frame 14. As described above, the vehicle body frame 10 is formed in a cradle shape. The power unit 30 is attached to the inside of the vehicle body frame 10, via a bracket (not shown) or the like.

A swing arm 17 is swingably supported at an intermediate portion of the body frame 13. The swing arm 17 extends rearward from the body frame 13. A rear wheel 19 is rotatably supported at a rear end of the swing arm 17. A front side of the swing arm 17 and a lower portion of the rear cushion 21 are connected via a triangular cushion lever 22. The cushion lever 22 and the body frame 13 are connected via a cushion rod 23. The rear cushion 21 is configured to expand and contract according to the swinging of the swing arm 17. Thus, the unevenness of a road surface is absorbed, the vibration is prevented, and the ground contact performance between the road surface and the rear wheel 19 is improved.

A drive sprocket 67 is fixed to a drive shaft 65 of the power unit 30. A driven sprocket 24 is fixed to an axle 18 of the rear wheel 19. A drive chain 25 is wound around the drive sprocket 67 and the driven sprocket 24. Power of an electric motor 61 (see FIG. 5) of the power unit 30 is transmitted to the rear wheel 19, via the drive chain 25. In such an electric vehicle, the vehicle size increases due to the protrusion, of the drive chain line, toward the outside in a vehicle width direction. Therefore, in the power unit 30 according to the present embodiment, the drive sprocket 67 is moved inward in the vehicle width direction, and the protrusion of the drive chain line is reduced.

Figure 2:
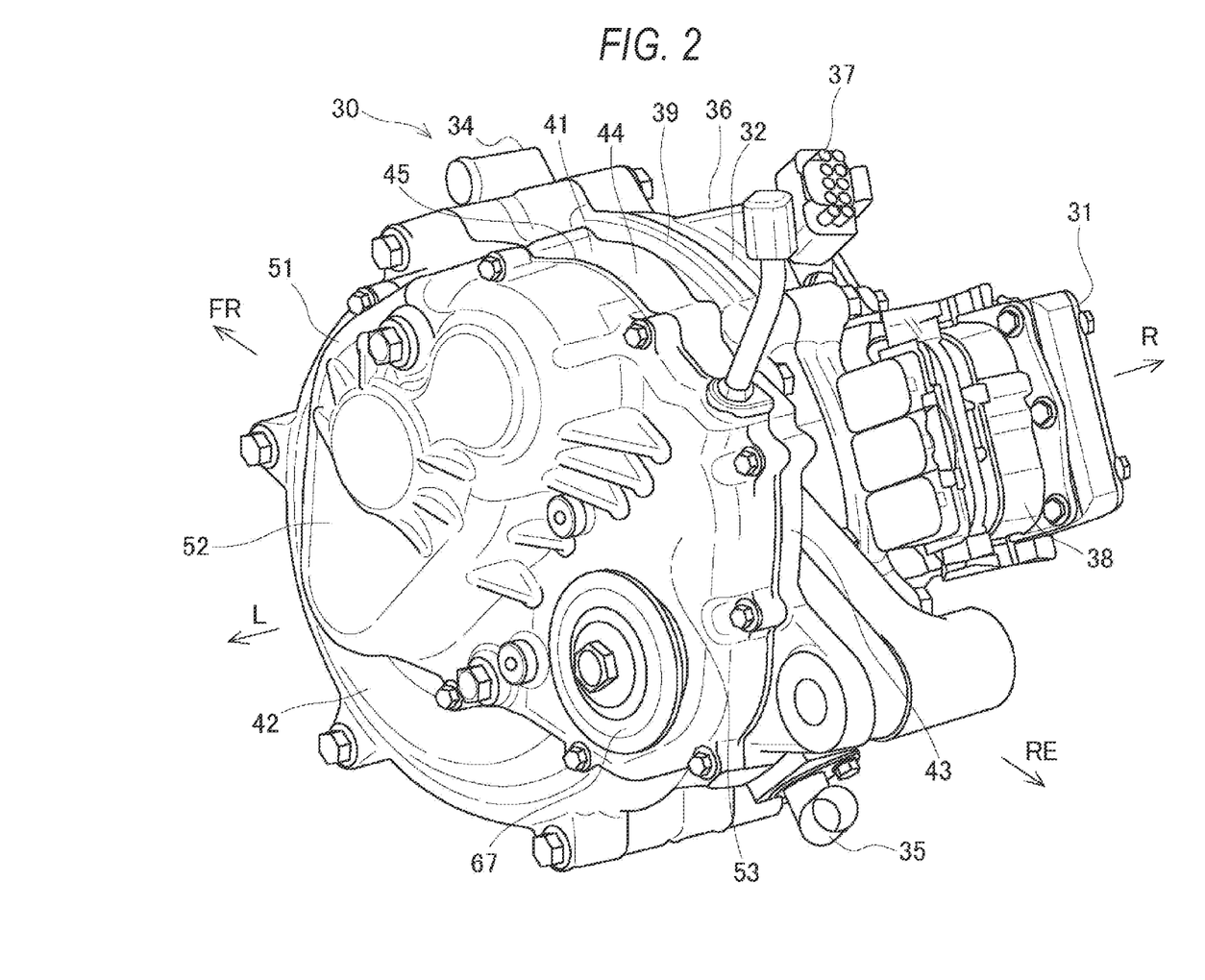
FIG. 2 is a perspective view of a power unit according to the exemplary embodiment of the present invention.
Figure 3:
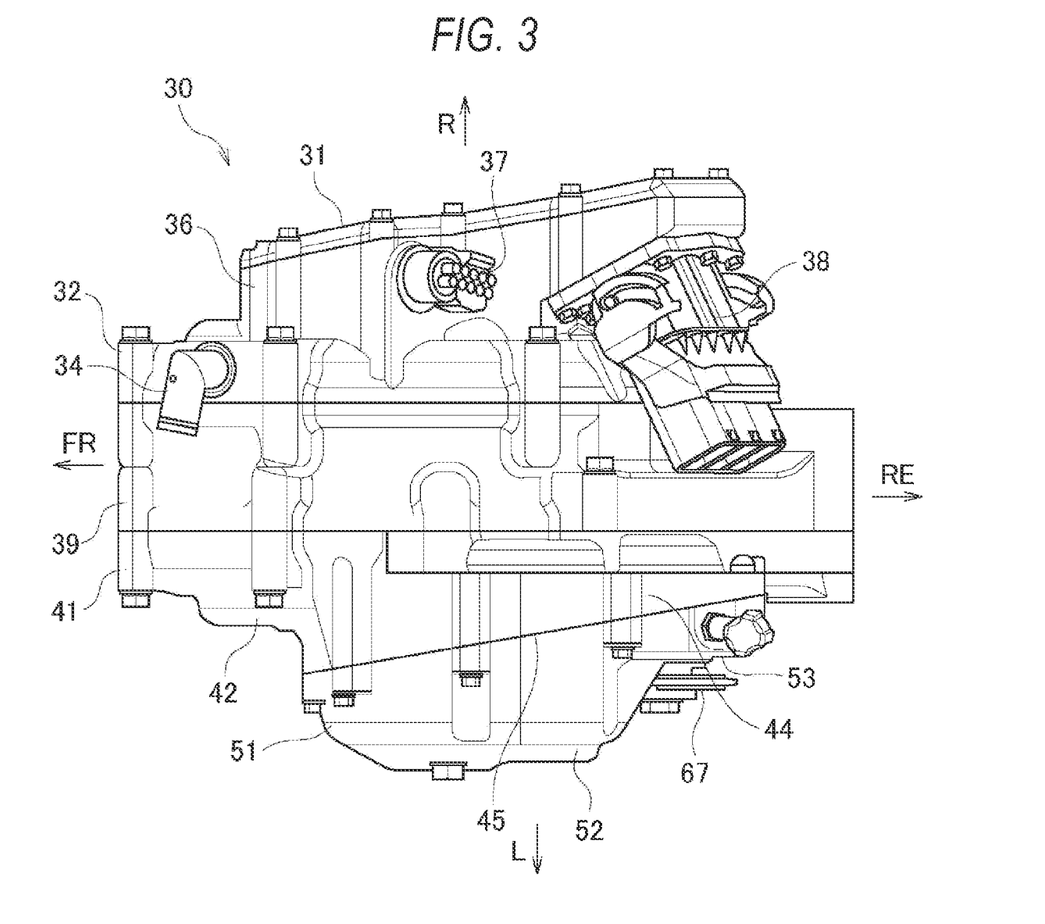
FIG. 3 is a top view of the power unit according to the exemplary embodiment of the present invention.
Figure 4:
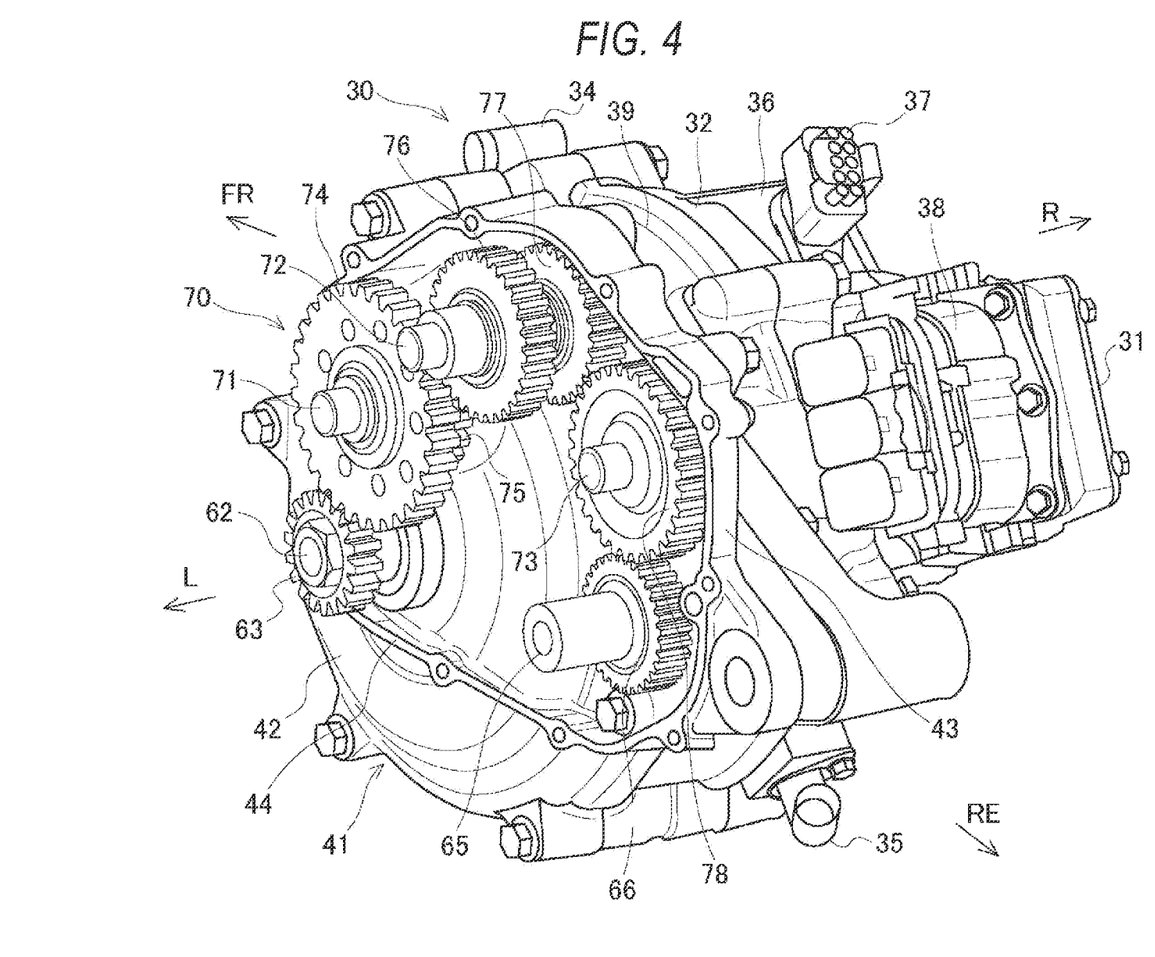
FIG. 4 is a perspective view of the power unit from which a gear case cover is removed, according to the exemplary embodiment of the present invention.
Figure 5:
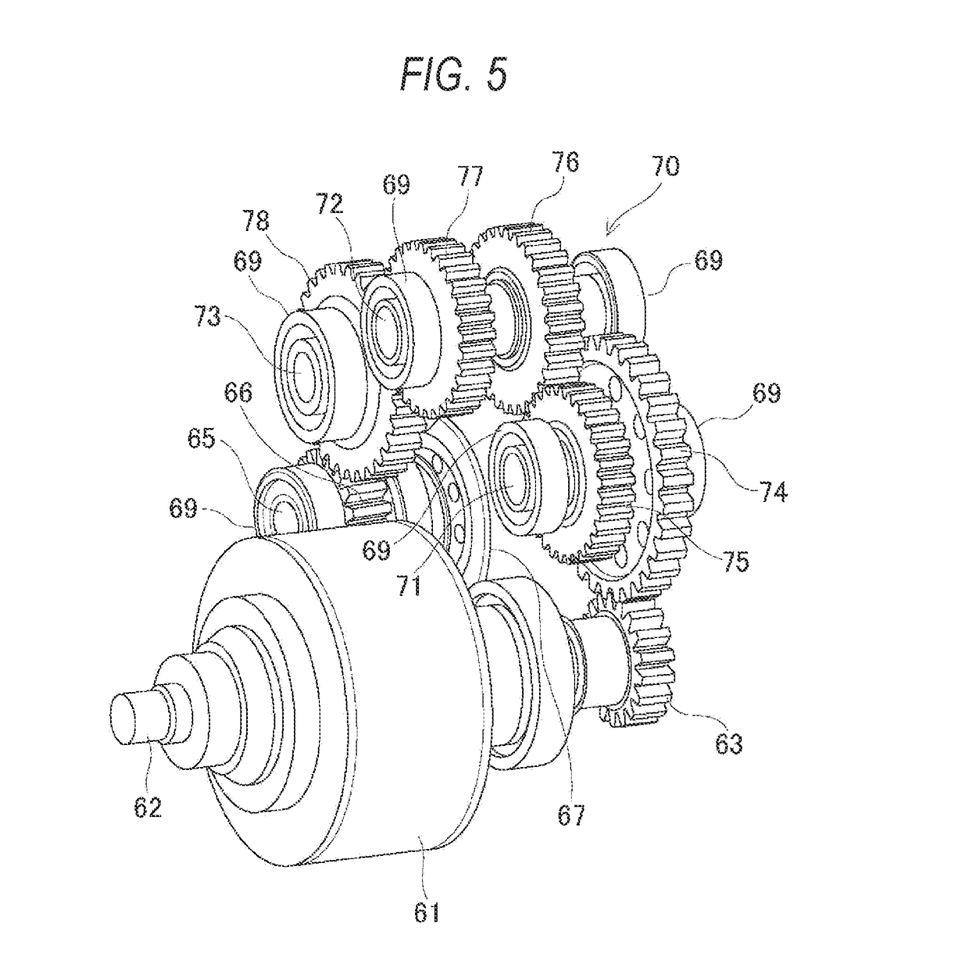
FIG. 5 is a perspective view of a power transmission mechanism and an electric motor according to the exemplary embodiment of the present invention.

A power unit will be described with reference to FIGS. 2 to 5. FIG. 2 is a perspective view of the power unit according to the present embodiment. FIG. 3 is a top view of the power unit according to the present embodiment. FIG. 4 is a perspective view of the power unit from which a gear case cover is removed, according to the present embodiment. FIG. 5 is a perspective view of a power transmission mechanism and an electric motor according to the present embodiment.

As shown in FIGS. 2 and 3, a unit case of the power unit 30 is divided into five parts of a gear case cover 51, a gear case 41, a left motor case 39, a right motor case 32, and a motor case cover 31, from a left side to a right side. An electric motor 61 (see FIG. 5) is provided inside the gear case 41, the left motor case 39, and the right motor case 32. A power transmission mechanism 70 (see FIG. 4) including a plurality of gears and the like is provided inside the gear case cover 51 and the gear case 41. In this way, the gear case 41 is used not only as a case for the gears but also as a case for the electric motor 61.

The right motor case 32 covers a right opening of the left motor case 39. An OUT pipe 34 for cooling water is provided on a front side of an upper surface of the right motor case 32. An IN pipe 35 for cooling water is provided on a rear side of a lower surface of the right motor case 32. A box-shaped housing 36 bulges rightward from an outer surface of the right motor case 32. A resolver 37 for detecting a rotor angle of the electric motor 61 is provided on an upper surface of the housing 36. A rear side of the upper surface of the housing 36 protrudes rearward and obliquely upward. A connector 38 for a three-phase line is provided at a protruding portion of the housing 36.

The gear case 41 is formed with a cylindrical cover 42 that covers a left opening of the left motor case 39 and that accommodates a left end side of the electric motor 61. A case protrudes rearward from the cylindrical cover 42, and a peripheral wall 44 surrounds a protruding portion 43 and a center of the cylindrical cover 42 (see FIG. 6 in particular).

The gear case cover 51 is attached to the peripheral wall 44 of the gear case 41, and a space for providing the power transmission mechanism 70 is formed. As described above, in the power unit 30 according to the present embodiment, the gear case 41 is provided on a left side (one side in the vehicle width direction) of the left motor case 39, and an opening of the peripheral wall 44 of the gear case 41 is covered with the gear case cover 51 from the outside in the vehicle width direction.

A region of a side surface of the gear case cover 51 from a rear side to a center lower portion is one step lower inward in the vehicle width direction than a region of the side surface of the gear case cover 51 from a front side to a center upper portion. A lower step portion 53 of the gear case cover 51 is flat, and the drive sprocket 67 is provided on a flat surface. The drive sprocket 67 is positioned inward, in the vehicle width direction, of an upper step portion 52 of the gear case cover 51. As viewed from above, a mating surface 45 of the gear case 41 and the gear case cover 51 is inclined inward in the vehicle width direction toward rear of the power unit. Thus, the drive sprocket 67 is easily provided inward in the vehicle width direction.

As shown in FIGS. 4 and 5, a motor shaft 62 of the electric motor 61 penetrate through the center of the cylindrical cover 42 of the gear case 41, and protrudes from a left motor case 39 side toward the gear case 41. An output gear 63 is fixed to a distal end of the motor shaft 62. The drive shaft 65 is provided in the protruding portion 43 of the gear case 41 behind the motor shaft 62. The drive shaft 65 protrudes outward in the vehicle width direction from the gear case cover 51 (see FIG. 2). A drive gear 66 is provided in an inner side, in the vehicle width direction, of the drive shaft 65. The drive sprocket 67 is fixed to a distal end of the drive shaft 65 on an outer side in the vehicle width direction.

The output gear 63 is fixed to the motor shaft 62, inside the gear case cover 51. The drive sprocket 67 is fixed to the drive shaft 65, outside the gear case cover 51. More specifically, the output gear 63 is accommodated inside the upper step portion 52 (see FIG. 2) of the gear case cover 51. The drive sprocket 67 is exposed to the outside of the lower step portion 53 (see FIG. 2) of the gear case cover 51. The drive sprocket 67 is positioned inward, in the vehicle width direction, of the output gear 63 such that the chain line of the drive chain 25 (see FIG. 1) does not protrude outward in the vehicle width direction, and the output gear 63 and the drive sprocket 67 are misaligned in the vehicle width direction.

The power transmission mechanism 70 configured to transmit power from the motor shaft 62 to the drive shaft 65 is accommodated inside the gear case 41 and the gear case cover 51. The power transmission mechanism 70 includes first to third intermediate shafts 71 to 73 arranged from the motor shaft 62 toward the drive shaft 65. The first intermediate shaft 71 is provided with first and second intermediate gears 74, 75. The second intermediate shaft 72 is provided with third and fourth intermediate gears 76, 77. The third intermediate shaft 73 is provided with a fifth intermediate gear 78. The motor shaft 62, the drive shaft 65, and the first to third intermediate shafts 71 to 73 are supported, via bearings 69, on the gear case 41 and the gear case cover 51.

The first intermediate gear 74 meshes with the output gear 63 of the motor shaft 62, and power is transmitted from the output gear 63 to the first intermediate gear 74. The second intermediate gear 75 is located inside, in the vehicle width direction, the first intermediate gear 74. The first intermediate gear 74 and the second intermediate gear 75 are integrally rotated via the first intermediate shaft 71. The third intermediate gear 76 meshes with the second intermediate gear 75, and power is transmitted from the second intermediate gear 75 to the third intermediate gear 76. The fourth intermediate gear 77 is located inside, in the vehicle width direction, the third intermediate gear 76. The third intermediate gear 76 and the fourth intermediate gear 77 are integrally rotated via the second intermediate shaft 72.

The fifth intermediate gear 78 meshes with the fourth intermediate gear 77, and power is transmitted from the fourth intermediate gear 77 to the fifth intermediate gear 78. The drive gear 66 meshes with the fifth intermediate gear 78, and power is transmitted from the fifth intermediate gear 78 to the drive gear 66. The drive sprocket 67 is located outside, in the vehicle width direction, the drive gear 66. The drive gear 66 and the drive sprocket 67 are integrally rotated via the drive shaft 65. Power is transmitted from the electric motor 61 to the drive sprocket 67, via a gear train including the output gear 63, the first intermediate gear 74 to the fifth intermediate gear 78, and the drive gear 66.

Figure 6:
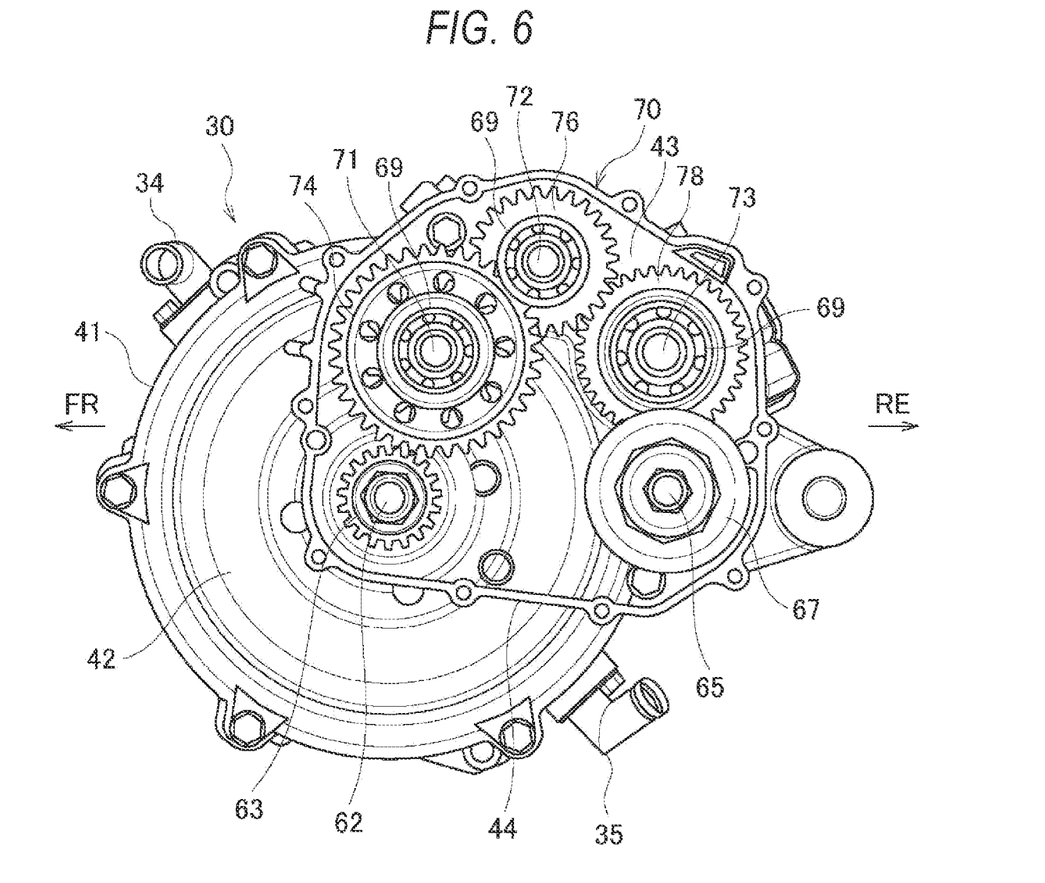
FIG. 6 is a left side view of the power unit from which the gear case cover is removed, according to the exemplary embodiment of the present invention.
Figure 7:
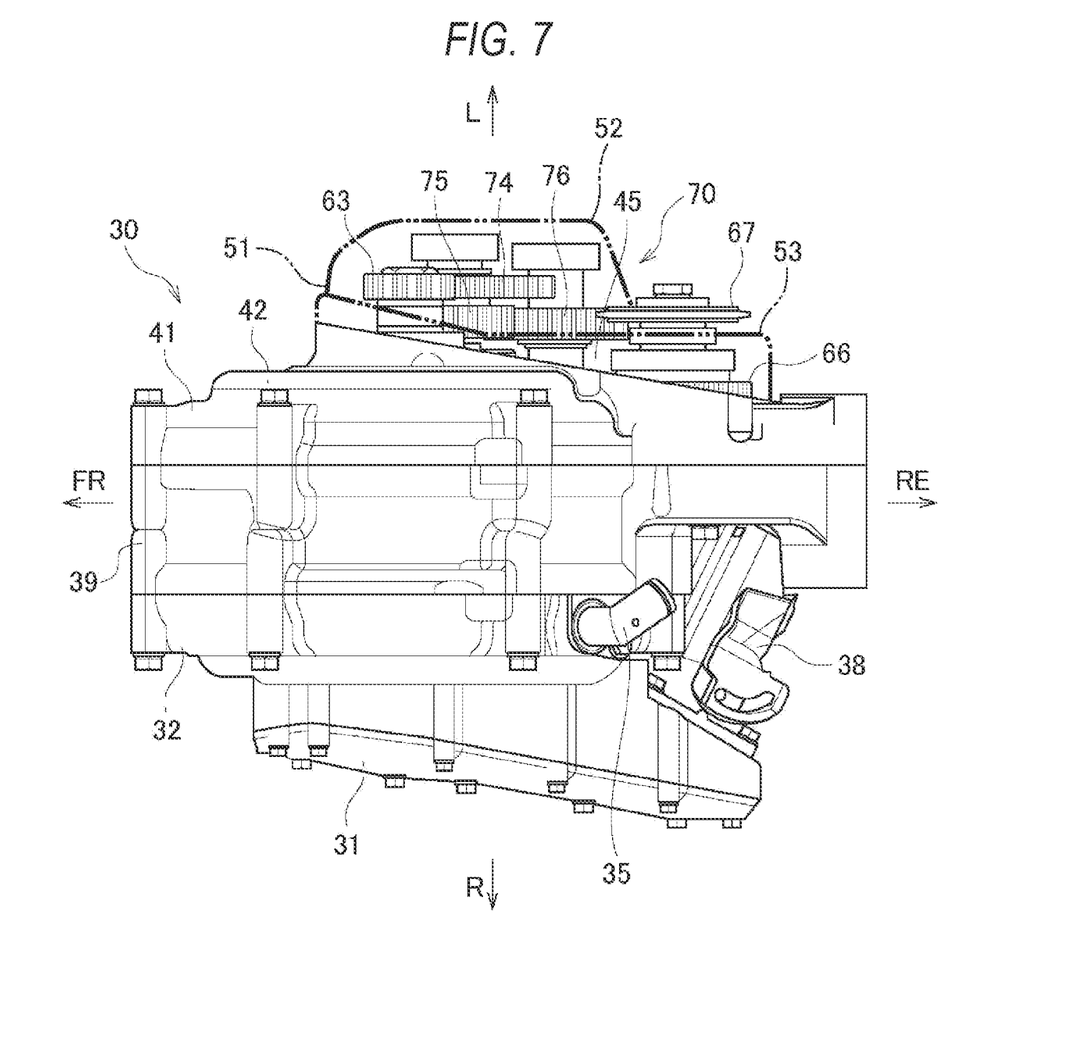
FIG. 7 is a bottom view of the power unit from which the gear case cover is removed, according to the exemplary embodiment of the present invention.
Figure 8:
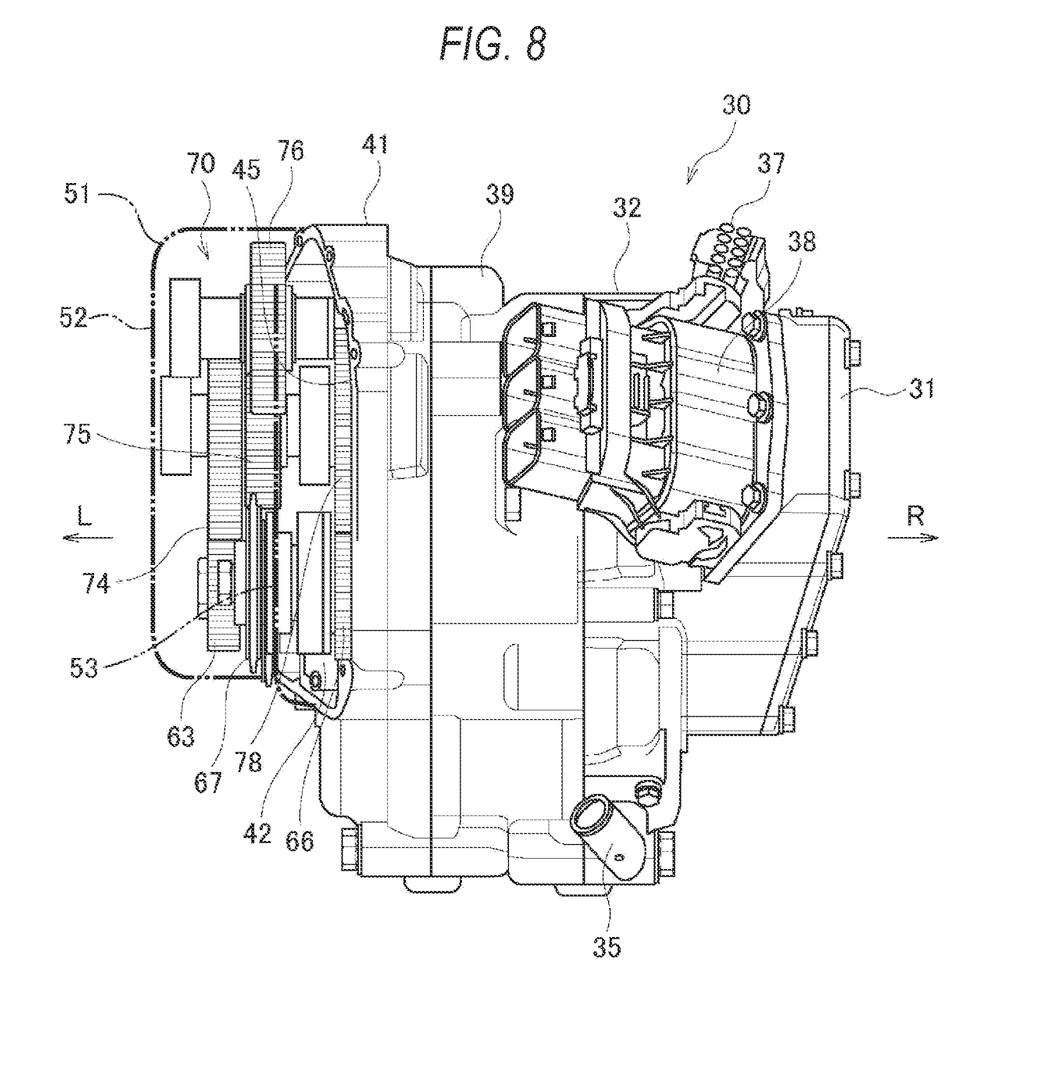
FIG. 8 is a rear view of the power unit from which the gear case cover is removed, according to the exemplary embodiment of the present invention.

The component layout of the power unit will be described in detail with reference to FIGS. 6 to 8. FIG. 6 is a right side view of the power unit from which the gear case cover is removed, according to the present embodiment. FIG. 7 is a bottom view of the power unit from which the gear case cover is removed, according to the present embodiment. FIG. 8 is a rear view of the power unit from which the gear case cover is removed, according to the present embodiment.

As shown in FIG. 6, as viewed from a side, the motor shaft 62 and the drive shaft 65 are positioned at the same height. The first intermediate shaft 71 to the third intermediate shaft 73 of the power transmission mechanism 70 are positioned above the motor shaft 62 and the drive shaft 65. The first intermediate shaft 71 is located rearward and obliquely above the motor shaft 62. The second intermediate shaft 72 is located rearward and obliquely above the first intermediate shaft 71. The third intermediate shaft 73 is located rearward and obliquely below the second intermediate shaft 72. The drive shaft 65 is located below the third intermediate shaft 73. The space for providing the power transmission mechanism 70 is provided above the motor shaft 62 and the drive shaft 65, and the longitudinal length of the power transmission mechanism 70 is reduced. Thus, the size of the power unit 30 is reduced.

The cylindrical cover 42 bulges from an outer surface of the gear case 41. The motor shaft 62 and the first intermediate shaft 71 are located on the cylindrical cover 42, as viewed from the side. The first intermediate shaft 71 is provided with the first intermediate gear 74 that is the most upstream gear, in a power transmission direction, among the plurality of intermediate gears. The first intermediate gear 74 has the largest diameter. Most of the first intermediate gear 74 overlaps the cylindrical cover 42, as viewed from the side. The first intermediate gear 74 is provided on a side of the cylindrical cover 42. Accordingly, the third intermediate gear 76 to the fifth intermediate gear 78 are provided at a position one step lower, in the vehicle width direction, than the cylindrical cover 42. Thus, the drive sprocket 67 is easily provided on an inner side in the vehicle width direction.

The protruding portion 43 extends rearward from the cylindrical cover 42 of the gear case 41. The second intermediate shaft 72, the third intermediate shaft 73, and the drive shaft 65 are provided along an outer periphery of the cylindrical cover 42 in the protruding portion 43. The third intermediate gear 76 to the fifth intermediate gear 78, the drive gear 66 (see FIG. 7), and the drive sprocket 67 (see FIG. 7) are compactly provided around the cylindrical cover 42, and the size of the power unit 30 is reduced. In the present embodiment, not only the motor shaft 62 and the drive shaft 65 but also the first intermediate shaft 71 and the third intermediate shaft 73 have the same height. However, the two shafts do not need to have completely the same height, and may have an error to the extent that the two shafts can be regarded as having substantially the same height.

The power transmission mechanism 70 further includes the fifth intermediate gear 78 to provide the drive shaft 65 directly behind the motor shaft 62. In order to increase the total speed reduction ratio of the power transmission mechanism 70, it is desirable to increase the number of teeth of the drive gear 66 more than that of the fifth intermediate gear 78. However, in that case, the outer diameter of the drive gear 66 is increased, and the drive shaft 65 is moved away from the motor shaft 62. Therefore, in the present embodiment, by reducing the number of teeth of the drive gear 66 less than that of the fifth intermediate gear 78, the outer diameter of the drive gear 66 is reduced, the drive shaft 65 is brought close to the motor shaft 62, and the size of the power unit 30 is reduced.

As shown in FIGS. 7 and 8, as viewed from above, the mating surface 45 of the gear case 41 and the gear case cover 51 is inclined inward in the vehicle width direction toward rear of the power unit 30. The output gear 63, the first intermediate gear 74 to the third intermediate gear 76, and the drive sprocket 67 are provided outside, in the vehicle width direction, of the mating surface 45. The fourth intermediate gear 77, the fifth intermediate gear 78 (see FIG. 5), and the drive gear 66 are provided inside, in the vehicle width direction, of the mating surface 45. The output gear 63 and the first intermediate gear 74 to the third intermediate gear 76 that protrude from the mating surface 45 are accommodated in the upper step portion 52 of the gear case cover 51. The drive sprocket 67 protruding from the mating surface 45 is exposed from the lower step portion 53 of the gear case cover 51.

The mating surface 45 is inclined inward in the vehicle width direction toward rear of the power unit 30, and a rear portion of the gear case cover 51 is formed one step lower than a front portion of the gear case cover 51. Accordingly, the rear portion of the gear case cover 51 is moved inward in the vehicle width direction, and the drive sprocket 67 outside the gear case cover 51 is provided on the inner side in the vehicle width direction. The drive sprocket 67 is positioned inward, in the vehicle width direction, of the output gear 63. The chain line of the drive chain 25 (see FIG. 1) hooked on the drive sprocket 67 is moved inward, in the vehicle width direction, of an upper end portion of the gear case cover 51, and the size of the power unit 30 is reduced.

Inside the gear case cover 51, the output gear 63 is provided on the outermost side in the vehicle width direction, and the first intermediate gear 74 to the fifth intermediate gear 78 and the drive gear 66 are provided on the inner side in the vehicle width direction toward downstream in the power transmission direction. The first intermediate gear 74 is provided at the same position as the output gear 63 in the vehicle width direction. The second intermediate gear 75 and the third intermediate gear 76 are provided inside, in the vehicle width direction, of the first intermediate gear 74. The fourth intermediate gear 77, the fifth intermediate gear 78, and the drive gear 66 are provided inside, in the vehicle width direction, of the third intermediate gear 76. Accordingly, the drive sprocket 67 coaxial with the drive gear 66 is easily provided on the inner side in the vehicle width direction.

In a state in which the gear case cover 51 is removed, as viewed from the rear, most of the gears are visible. As viewed from the rear, the first intermediate gear 74 to the third intermediate gear 76 are provided outside an outer surface of the cylindrical cover 42, and the fourth intermediate gear 77, the fifth intermediate gear 78, and the drive gear 66 are provided inside, in the vehicle width direction, of the outer surface of the cylindrical cover 42. The fourth intermediate gear 77, the fifth intermediate gear 78, and the drive gear 66 overlap the cylindrical cover 42. Accordingly, the drive sprocket 67 coaxial with the drive gear 66 is easily provided on the inner side in the vehicle width direction. The lateral width of the power transmission mechanism 70 is reduced, and the size of the power unit 30 is reduced.

As described above, according to the power unit 30 in the present embodiment, the output gear 63 and the drive sprocket 67 are provided on one side in the vehicle width direction. Thus, the power transmission mechanism 70 is formed compactly. The drive sprocket 67 outside the gear case cover 51 is positioned inward, in the vehicle width direction, of the output gear 63 inside the gear case cover 51. Thus, the drive sprocket 67 is prevented from protruding outward in the vehicle width direction. The chain line of the drive chain 25 wound around the drive sprocket 67 of the power unit 30 and the driven sprocket 24 of the rear wheel 19 is moved inward in the vehicle width direction, and the sizes of the electric vehicle and the power unit 30 are reduced.

In the present embodiment, the power transmission mechanism includes a gear train. However, it is sufficient that the power transmission mechanism is configured to transmit power from the motor shaft to the drive shaft.

In the present embodiment, as viewed from above, the mating surface of the gear case and the gear case cover is inclined inward in the vehicle width direction toward rear of the power unit. Alternatively, the mating surface may not be inclined as long as the drive sprocket can be provided inside the output gear in the vehicle width direction.

In the present embodiment, the power transmission mechanism includes three intermediate shafts and five intermediate gears. However, the number, the installation locations, the sizes, and the like of the intermediate shafts and the intermediate gears of the power transmission mechanism are not particularly limited.

In the present embodiment, the number of teeth of the drive gear is smaller than that of the fifth intermediate gear. Alternatively, the number of teeth of the drive gear may be larger than that of the fifth intermediate gear as long as the drive shaft can be provided behind the motor shaft.

The power unit according to the present embodiment is not limited to the above straddle-type electric vehicle, and may be applied to other straddle-type electric vehicles. The straddle-type electric vehicle is not limited to an electric vehicle in which a driver rides on a seat in a posture of straddling the seat, and includes a scooter-type electric vehicle in which the driver rides on the seat without straddling the seat.

As described above, a first aspect provides a power unit (30) in which a gear case (41) is provided on one side, in a vehicle width direction, of a motor case (the left motor case 39 and the right motor case 32), an opening of the gear case being covered with a gear case cover (51) from an outside in the vehicle width direction. The power unit (30) includes: a motor shaft (62) protruding toward the gear case from a motor case side; a drive shaft (65) protruding outward in the vehicle width direction from the gear case cover; and a power transmission mechanism (70) configured to transmit power, to the drive shaft, from the motor shaft. An output gear (63) is fixed to the motor shaft, inside the gear case cover. A drive sprocket (67) is fixed to the drive shaft, outside the gear case cover. The drive sprocket is positioned inward, in the vehicle width direction, of the output gear. According to this configuration, the output gear and the drive sprocket are provided on one side in the vehicle width direction, and the power transmission mechanism is formed compactly. The drive sprocket outside the gear case cover is positioned inward, in the vehicle width direction, of the output gear inside the gear case cover, and the drive sprocket is prevented from protruding outward in the vehicle width direction. The chain line of the drive chain wound around the drive sprocket of the power unit and the driven sprocket of the drive wheel is moved inward in the vehicle width direction, and the sizes of the electric vehicle and the power unit are reduced.

A second aspect is directed to the first aspect, in which, as viewed from above, a mating surface (45) of the gear case and the gear case cover is inclined inward in the vehicle width direction toward rear of the power unit, and in which the drive sprocket is positioned behind the output gear. According to this configuration, the rear portion of the gear case cover is moved inward in the vehicle width direction, and the drive sprocket outside the gear case cover is provided on the inner side in the vehicle width direction.

A third aspect is directed to the first aspect and the second aspect, in which the power transmission mechanism includes a plurality of intermediate shafts (the first intermediate shaft 71 to the third intermediate shaft 73) provided with a plurality of intermediate gears (the first intermediate gear 74 to the fifth intermediate gear 78), and in which, inside the gear case cover, the output gear is provided on an outermost side in the vehicle width direction, and inside the gear case cover, the plurality of intermediate gears are provided such that an intermediate gear positioned on a downstream side in a power transmission direction is positioned on an inner side, in the vehicle width direction, of an intermediate gear positioned on an upstream side in a power transmission direction. According to this configuration, the drive sprocket is easily provided on the inner side in the vehicle width direction.

A fourth aspect is directed to the third aspect, in which a cylindrical cover (42) bulges from an outer surface of the gear case, the cylindrical cover covering an opening of the motor case, in which among the plurality of intermediate gears, an intermediate gear (the first intermediate gear 74) positioned on a most upstream in the power transmission direction has the largest diameter, and in which as viewed from a side, the intermediate gear positioned on the most upstream in the power transmission direction overlaps the cylindrical cover. According to this configuration, the intermediate gear having a large diameter is provided on the side of the cylindrical cover. Accordingly, the intermediate gear behind the intermediate gear having a large diameter is provided at a position one step lower, in the vehicle width direction, than the cylindrical cover. Thus, the drive sprocket is easily provided on a further inner side in the vehicle width direction.

A fifth aspect is directed to the third aspect or the fourth aspect, in which a first intermediate shaft (the second intermediate shaft 72 and the third intermediate shaft 73) and the drive shaft (65) are provided along an outer periphery of the cylindrical cover, the first intermediate shaft being positioned behind a second intermediate shaft to which the intermediate gear positioned on the most upstream in the power transmission direction is fixed. According to this configuration, a part of the intermediate gears and the drive sprocket are compactly provided around the cylindrical cover, and the size of the power unit is reduced.

A sixth aspect is directed to any one of the third aspect to the fifth aspect, in which as viewed from the side, the motor shaft and the drive shaft are positioned at the same height, and as viewed from the side, the plurality of intermediate shafts are positioned above the motor shaft and the drive shaft. According to this configuration, the longitudinal length of the power transmission mechanism is reduced, and the size of the power unit is reduced.

A seventh aspect is directed to any one of the third aspect to the sixth aspect, in which the drive shaft is provided with a drive gear (66), and in which, as viewed from rear, the drive gear and an intermediate gear (the fourth intermediate gear 77 and the fifth intermediate gear 78), among the plurality of intermediate gears, positioned on the downstream side in the power transmission direction overlap the cylindrical cover. According to this configuration, the drive sprocket coaxial with the drive gear is easily provided on the inner side in the vehicle width direction. The lateral width of the power transmission mechanism is reduced, and the size of the power unit is reduced.

An eighth aspect is directed to any one of the third aspect to the seventh aspect, in which the number of teeth of the drive gear is smaller than that the number of teeth of an intermediate gear (the fifth intermediate gear 78) positioned on a most downstream in the power transmission direction. According to this configuration, even in a case where the intermediate gear is added in order to provide the drive shaft rearward, the drive shaft is brought close to the motor shaft by an amount corresponding to the reduction in the diameter of the drive gear, and the size of the power unit is reduced.

Although the present embodiment has been described, other embodiments may be used in which the above embodiment and modification are combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power unit in which a gear case is provided on one side, in a vehicle width direction, of a motor case, an opening of the gear case being covered with a gear case cover from an outside in the vehicle width direction, the power unit comprising:
    a motor shaft protruding toward the gear case from a motor case side;
    a drive shaft protruding outward in the vehicle width direction from the gear case cover; and
    a power transmission mechanism configured to transmit, to the drive shaft, power from the motor shaft,
    wherein an output gear is fixed to the motor shaft, inside the gear case cover,
    a drive sprocket is fixed to the drive shaft, wherein an entirety of the drive sprocket is outside the gear case cover, and
    the drive sprocket is positioned inward, in the vehicle width direction, of the output gear.

2. The power unit according to claim 1,
wherein, as viewed from above, a mating surface of the gear case and the gear case cover is inclined inward in the vehicle width direction toward rear of the power unit, and
the drive sprocket is positioned behind the output gear.

3. The power unit according to claim 1,
wherein the power transmission mechanism includes a plurality of intermediate shafts provided with a plurality of intermediate gears,
inside the gear case cover, the output gear is provided on an outermost side in the vehicle width direction, and
inside the gear case cover, the plurality of intermediate gears are provided such that an intermediate gear positioned on a downstream side in a power transmission direction is positioned on an inner side, in the vehicle width direction, of an intermediate gear positioned on an upstream side in a power transmission direction.

4. The power unit according to claim 3,
wherein a cylindrical cover bulges from an outer surface of the gear case, the cylindrical cover covering an opening of the motor case,
among the plurality of intermediate gears, an intermediate gear positioned on a most upstream in the power transmission direction has the largest diameter, and
as viewed from a side, the intermediate gear positioned on the most upstream in the power transmission direction overlaps the cylindrical cover.

5. The power unit according to claim 4,
wherein a first intermediate shaft and the drive shaft are provided along an outer periphery of the cylindrical cover, the first intermediate shaft being positioned behind a second intermediate shaft to which the intermediate gear positioned on the most upstream in the power transmission direction is fixed.

6. The power unit according to claim 5,
wherein, as viewed from the side, the motor shaft and the drive shaft are positioned at the same height, and
as viewed from the side, the plurality of intermediate shafts are positioned above the motor shaft and the drive shaft.

7. The power unit according to claim 6,
wherein the drive shaft is provided with a drive gear, and as viewed from rear, the drive gear and an intermediate gear, among the plurality of intermediate gears, positioned on the downstream side in the power transmission direction overlap the cylindrical cover.

8. The power unit according to claim 7,
wherein the number of teeth of the drive gear is smaller than the number of teeth of an intermediate gear positioned on a most downstream in the power transmission direction.

* * * * *